(12) United States Patent
Nanaumi

(10) Patent No.: US 8,976,391 B2
(45) Date of Patent: Mar. 10, 2015

(54) INFORMATION PROCESSING DEVICE AND INFORMATION PROCESSING METHOD FOR DETERMINING A CLOSEST IMAGE FORMING DEVICE

(71) Applicant: Canon Kabushiki Kaisha, Tokyo (JP)

(72) Inventor: Yoshihito Nanaumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 88 days.

(21) Appl. No.: 13/784,676

(22) Filed: Mar. 4, 2013

(65) Prior Publication Data

US 2013/0258399 A1    Oct. 3, 2013

(30) Foreign Application Priority Data

Mar. 27, 2012 (JP) ................................. 2012-072344

(51) Int. Cl.
*G06F 3/12* (2006.01)
*G06K 15/00* (2006.01)

(52) U.S. Cl.
CPC ............ *G06K 15/405* (2013.01); *G06F 3/1204* (2013.01); *G06F 3/1232* (2013.01); *G06F 3/1292* (2013.01)
USPC ........................................ 358/1.15; 358/1.13

(58) Field of Classification Search
USPC .................................. 358/1.15, 1.16, 1.13
See application file for complete search history.

(56) References Cited

U.S. PATENT DOCUMENTS

| 7,689,725 | B2 | 3/2010 | Nakamura | |
|---|---|---|---|---|
| 2005/0209963 | A1* | 9/2005 | Momose | ........................ 705/39 |
| 2008/0239392 | A1 | 10/2008 | Nanaumi | |
| 2011/0194140 | A1 | 8/2011 | Sweet et al. | |

FOREIGN PATENT DOCUMENTS

JP    2005-115926 A    4/2005

* cited by examiner

*Primary Examiner* — Thomas Lett
(74) *Attorney, Agent, or Firm* — Fitzpatrick, Cella, Harper & Scinto

(57) ABSTRACT

A mobile terminal is connected to a server and an image forming device that store image forming device information in such a manner that the mobile terminal can communicate with the server and the image forming device. The mobile terminal acquires image forming device information from the selected server and/or image forming device. When the acquired image forming device information includes duplication of an image forming device, an image forming device list is generated by removing the duplication. Information of an image forming device to be used is displayed on a user interface of the mobile terminal. A usable image forming device is selected and presented to a user.

11 Claims, 14 Drawing Sheets

FIG. 5A

| MIB_ID | DeviceName | IPAddress | MACAddress |
|---|---|---|---|
| DE7152B2-32D4-42B4-A0E7-70D9CAEC730B | PRINTER A | 172.24.16.186 | 00-50-56-C0-00-08 |

FIG. 5B

| Bluetooth_ID | Device_Status | Device_Location | Profile |
|---|---|---|---|
| DE7152B2-32D4-42B4-A0E7-70D9CAEC730B | TRUE | latitude33.72,longitude 130.46 | GAP,BPP,GOEP |

FIG. 6

| RPID | Device Name | Device_Location | DeviceID | IPAddress | Capabability | Device_Status |
|---|---|---|---|---|---|---|
| ABE889B9-2821-4452-939F-18FA7DB2CD53 | PRINTER A | latitude33.72, longitude 130.46 | DE7152B2-32D4-42B4-A0E7-70D9CAEC730B | 172.24.16.186 | ... | TRUE |

FIG. 7A

| ADID | AcquiredSource | Status | Orignal Data | MDID |
|---|---|---|---|---|
| 0537D5B9-1F0B-4FE8-8C6D-FF6BE5450CD4 | Wi-Fi ACCESS POINT_key | TRUE | ... | 4A98F250-1061-45F8-B554-F8DC37C9748D |
| A237B34A-BB45-46A6-B4E1-7B094667969D | PRINT SERVER_key | TRUE | ... | 4A98F250-1061-45F8-B554-F8DC37C9748D |
| 0537D5B9-1F0B-4FE8-8C6D-FF6BE5450CD4 | Bluetooth_key | TRUE | ... | 4A98F250-1061-45F8-B554-F8DC37C9748D |

FIG. 7B

| MDID | Device_Key | Device Name | Device_Status | Capability | DeviceLocation | Status |
|---|---|---|---|---|---|---|
| 4A98F250-1061-45F8-B554-F8DC37C9748D | DE7152B2-32D4-42B4-A0E7-70D9CAEC730B | PRINTER A | TRUE | ... | latitude 33.72, longitude 130.46 | TRUE |

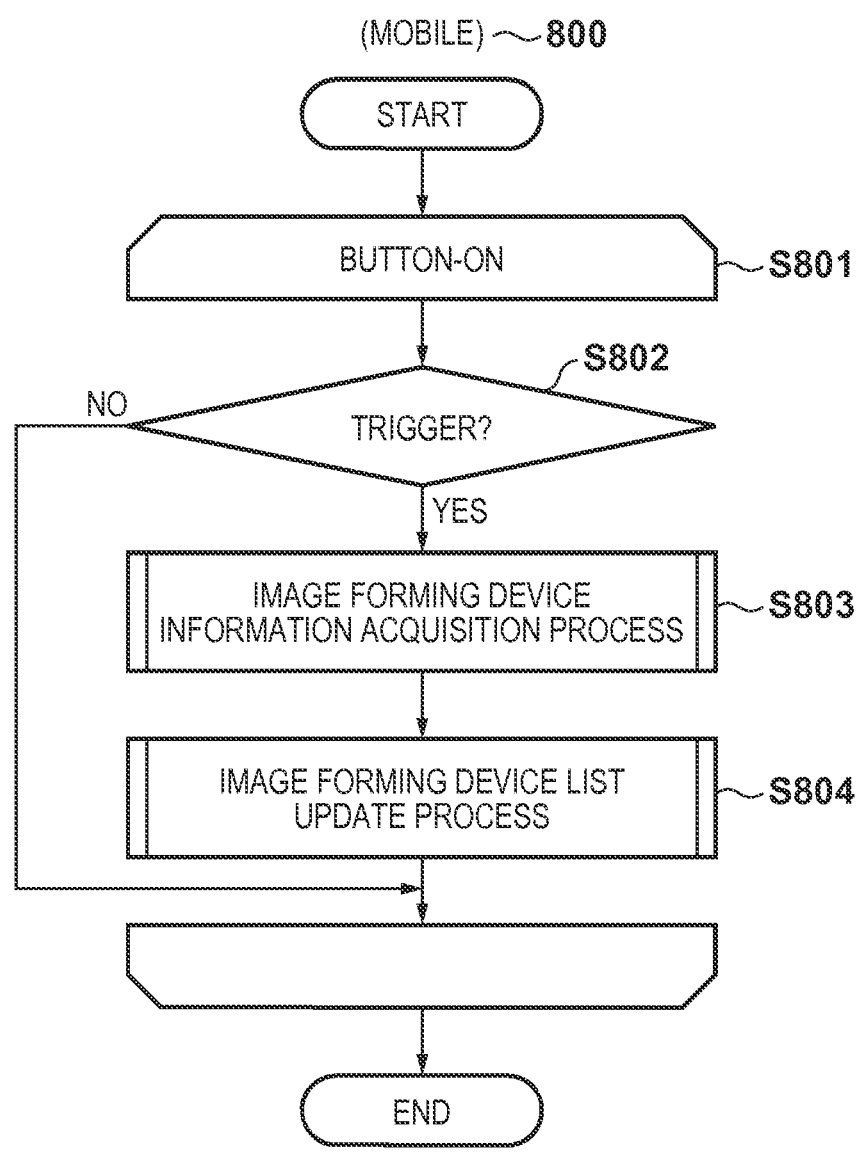

FIG. 9

| TRIGGER | IMAGE FORMING DEVICE INFORMATION ACQUISITION PROCESS | IMAGE FORMING DEVICE LIST UPDATE PROCESS |
|---|---|---|
| BUTTON-ON TRIGGER | ALL DEVICE INFORMATION ACQUISITION PROCESSES | IMAGE FORMING DEVICE LIST UPDATE PROCESS |
| BUTTON-OFF TRIGGER | NONE | NONE |
| TIMER TRIGGER | ALL DEVICE INFORMATION ACQUISITION PROCESSES | IMAGE FORMING DEVICE LIST UPDATE PROCESS |
| Wi-Fi ACCESS POINT DETECTION TRIGGER | LAN DEVICE INFORMATION ACQUISITION PROCESS | IMAGE FORMING DEVICE LIST UPDATE PROCESS |
| Wi-Fi ACCESS POINT DISCONNECTION TRIGGER | IMAGE FORMING DEVICE INFORMATION DEACTIVATION PROCESS | DEACTIVATION OF DEVICES IN IMAGE FORMING DEVICE LIST |
| LOCATION INFORMATION CHANGE TRIGGER | PRINT SERVER DEVICE INFORMATION ACQUISITION PROCESS | IMAGE FORMING DEVICE LIST UPDATE PROCESS |
| Bluetooth DETECTION TRIGGER | Bluetooth DEVICE INFORMATION ACQUISITION PROCESS | IMAGE FORMING DEVICE LIST UPDATE PROCESS |
| Bluetooth DISCONNECTION TRIGGER | IMAGE FORMING DEVICE INFORMATION DEACTIVATION PROCESS | DEACTIVATION OF DEVICES IN IMAGE FORMING DEVICE LIST |
| Wi-Fi DIRECT DETECTION TRIGGER | Wi-Fi DIRECT DEVICE INFORMATION ACQUISITION PROCESS | IMAGE FORMING DEVICE LIST UPDATE PROCESS |
| Wi-Fi DIRECT DISCONNECTION TRIGGER | IMAGE FORMING DEVICE INFORMATION DEACTIVATION PROCESS | DEACTIVATION OF DEVICES IN IMAGE FORMING DEVICE LIST |

F I G. 12

| 1 | Wi-Fi |
| --- | --- |
| 2 | Wi-Fi Direct |
| 3 | Bluetooth |
| 4 | PRINT SERVER |

1200

INFORMATION PROCESSING DEVICE AND INFORMATION PROCESSING METHOD FOR DETERMINING A CLOSEST IMAGE FORMING DEVICE

BACKGROUND OF THE INVENTION

1. Field of the Invention

The present invention relates to an information processing device and method.

2. Description of the Related Art

In recent years, attention has been drawn to client terminals such as PC terminals and mobile terminals, typical examples of which include iPhones and mobile telephones operating with the Android OS. There is technology to print from a mobile terminal via LAN or other networks connecting between the mobile terminal and an image forming device. There is also technology to print with a mobile terminal connected directly to an image forming device using near field communication such as Bluetooth built in the mobile terminal. Furthermore, for example, Google recently revealed a mechanism for conducting printing with coordination between cloud computing environments and an image forming device. In addition, US-2011-0194140 discloses a configuration for conducting printing with coordination among a mobile terminal, an image forming device and cloud computing environments. As such, there are various methods for printing from a mobile terminal with the use of an image forming device.

Moreover, Japanese Patent Laid-Open No. 2005-115926 discloses a configuration whereby wired connection is preferentially used under the presence of a plurality of communication media, e.g. when both wired connection and wireless connection are established between a PC terminal and an image forming device.

As users carry mobile terminals for use, the environment of the mobile terminals changes. Therefore, the users need to register image forming devices to be used depending on the environments. Moreover, when a plurality of communication media is usable, the users need to go to the trouble of conducting printing with a selection of an appropriate medium.

SUMMARY OF THE INVENTION

The present invention provides an information processing device and method that reduce the operational burden on a user by appropriately selecting a resource used by the mobile terminal, such as an image forming device and a communication medium, in accordance with the status of the information processing device.

The present invention has the following configuration.

According to an aspect of the present invention, an information processing device comprises: an acquisition unit that acquires first information related to an image forming device from a server and second information related to the image forming device from the image forming device; and a presentation unit that presents information related to the image forming device so that the image forming device is a single device when the first information is the same as the second information.

According to the above configuration, a resource suitable for a mobile terminal, such as an image forming device and a communication medium, can be automatically found and used without user's awareness.

Further features of the present invention will become apparent from the following description of exemplary embodiments with reference to the attached drawings.

BRIEF DESCRIPTION OF THE DRAWINGS

FIGS. 5A and 5B show examples of a data structure (image forming device).

FIG. 6 shows one example of a data structure (print server).

FIGS. 7A and 7B show examples of a data structure (mobile terminal).

FIG. 8 shows one example of a process of a mobile terminal.

FIG. 9 shows examples of processes of a mobile terminal.

FIG. 12 shows one example of a print priority order table.

DESCRIPTION OF THE EMBODIMENTS

The following describes embodiments of the present invention based on the drawings. Note that the embodiments do not limit the present invention, and not all configurations described in the embodiments are indispensable as means to solve the problem discussed in the present invention.

First Embodiment

System Configuration

Figure 1:
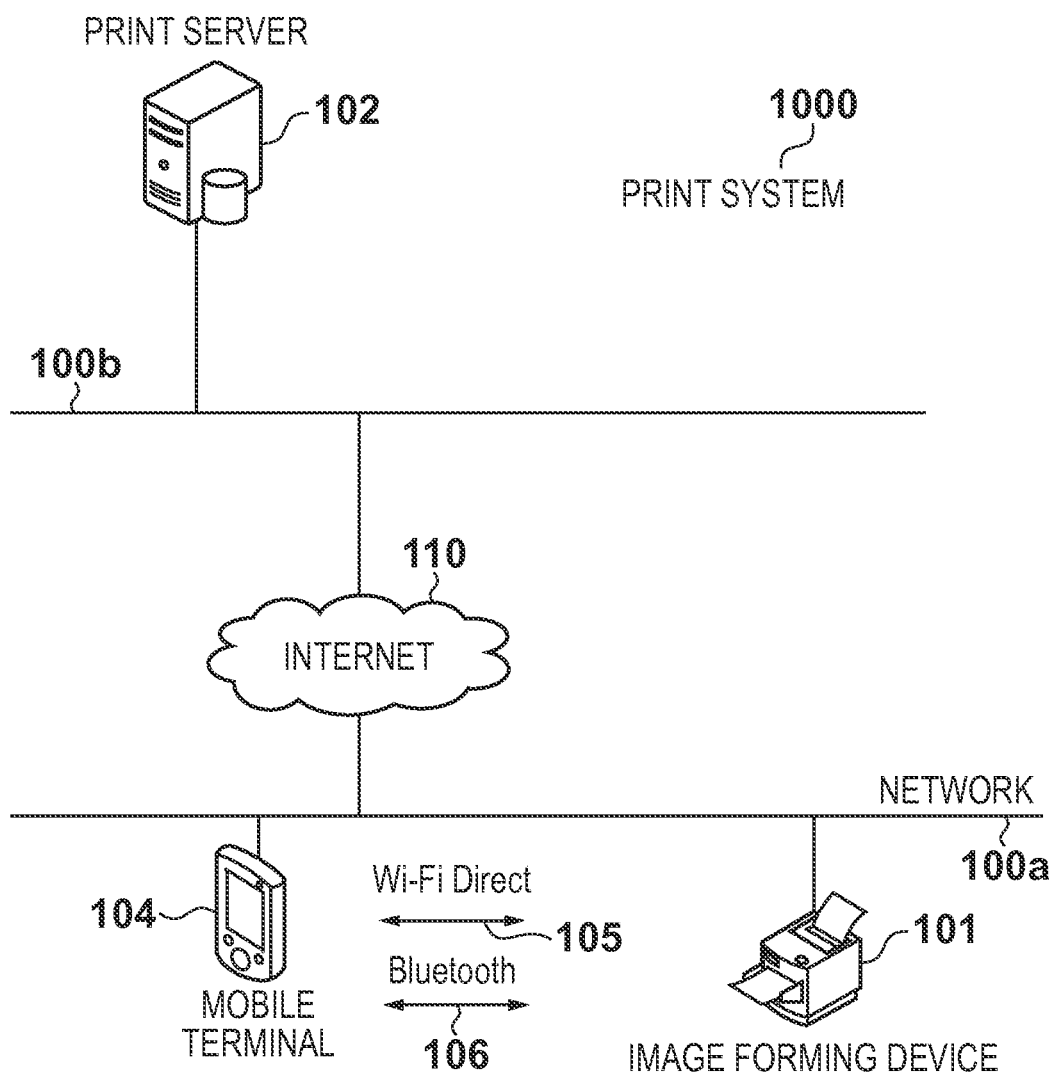
FIG. 1 shows one example of a configuration of a print system.

A description is now given of a configuration of a print system according to the present embodiment with reference to FIG. 1. FIG. 1 shows one example of a configuration of a print system 1000. The print system 1000 includes a mobile terminal 104 and an image forming device 101. These two devices are located in a user environment, and are connected to each other via a network 100a and to the Internet 110. The mobile terminal 104 is connectable to the network 100a via mobile Wi-Fi and the like. Depending on a network configuration, there may be cases where the mobile terminal 104 is not connected to the image forming device. In such cases, the mobile terminal 104 is connected to the image forming device via the Internet. Note that such cases are not discussed in the present embodiment. Furthermore, the mobile terminal 104 may have a function of connecting to a telephone line so as to connect directly to the Internet 110 without using LAN. The mobile terminal 104, which is one example of a mobile terminal, is usable from any place as long as it has a wireless communication function and the like. Regardless of its size and external appearance, a mobile terminal is substantially a mobile computer. Furthermore, the mobile terminal 104 and the image forming device 101 can be connected directly to each other via, for example, Wi-Fi Direct 105 that enables wireless communication between devices without using an access point, Bluetooth 106 which is one example of near field communication technology, and a wireless LAN which is not shown in the figures. The print system 1000 also includes a print server 102. The print server 102 is connected to the Internet 110 via a network 100b in such a manner that the print server 102 can communicate with the Internet 110. Although the number of each device (101, 102 and 104) is only one according to the illustration of the present embodiment, it may instead be two or more.

Furthermore, the networks 100 and the Internet 110 are, for example, communication line networks supporting TCP/IP and the like, and may be either wired networks or wireless networks.

Hardware Configuration

Figure 2:
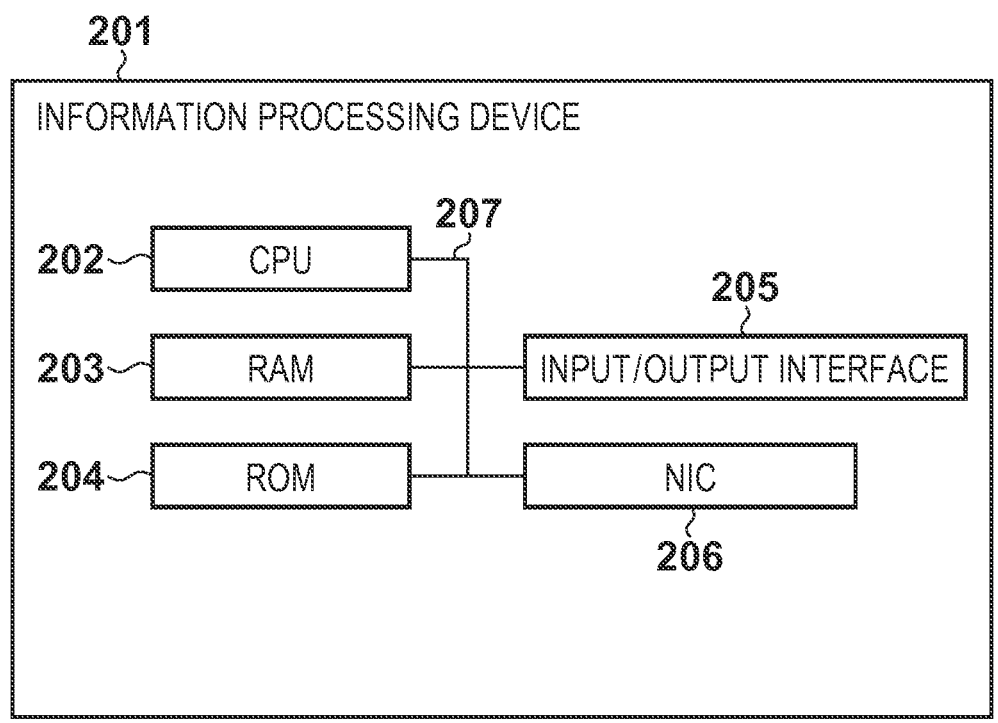
FIG. 2 shows one example of a hardware configuration of devices.

Next, a description is given of a hardware configuration of the devices constituting the print system 1000 with reference to FIG. 2. FIG. 2 shows one example of a hardware configuration of the devices constituting the print system 1000. The devices constituting the print system 1000 each include an information processing device (computer) 201. The information processing device 201 includes various types of units (202 to 207).

A central processing unit (CPU) 202 executes various types of programs and realizes various functions in accordance with the programs. A read-only memory (ROM) 204 is a unit that stores various types of programs, data and the like. A random-access memory (RAM) 203 is a unit that stores various types of information. The RAM 203 is also a unit used as a temporary work storage area for the CPU 202. For example, the CPU 202 loads the programs and data stored in the ROM 204 into the RAM 203 and executes the programs.

An input/output interface 205 is a unit that transmits data to a display (not shown in the figures) connected to the information processing device 201 and receives data from a pointing device (not shown in the figures).

A network interface card (NIC) 206 is a unit for connecting the information processing device 201 to the networks 100. The above units are configured so that they can transmit and receive data via a bus 207.

Note that the NIC 206 in the image forming device 101 and the mobile terminal 104 is a wireless communication NIC (not shown in the figures). The wireless communication NIC is a unit for connecting to the networks 100 via wireless communication. With the wireless communication NIC, Wi-Fi Direct can be used that enables wireless communication between devices without using an access point. The image forming device 101 and the mobile terminal 104 further include a Bluetooth unit (not shown in the figures). The Bluetooth unit is for exchanging data between devices via near field communication.

The image forming device 101 further includes a print unit (not shown in the figures). The print unit is configured so that it can transmit data to and receive data from each unit via the bus 207. Note that the print unit can record (print) a raster image on a recording medium such as a paper.

The image forming device 101 further includes a scanner unit (not shown in the figures). The scanner unit is configured so that it can transmit data to and receive data from each unit via the bus 207. Note that the scanner unit can input images. Although the image forming device 101 is a so-called multi-function peripheral provided with the scanner unit in the present example, the image forming device 101 may instead be a printer without the scanner unit.

Furthermore, in the mobile terminal 104, a touchscreen (not shown in the figures) is connected to the input/output interface 205. The touchscreen is one example of a human interface device in which a touch sensor is provided on a display unit such as a display and the like. The touchscreen has two functions, that is to say, output (display) and input. The touchscreen displays images and the like on a screen. When a user touches the screen displaying graphics, points or sections by hand, the touchscreen senses information of a location touched on the screen, and transmits the sensed information of the location to the CPU 202.

Software Configuration (General)

Figure 3:
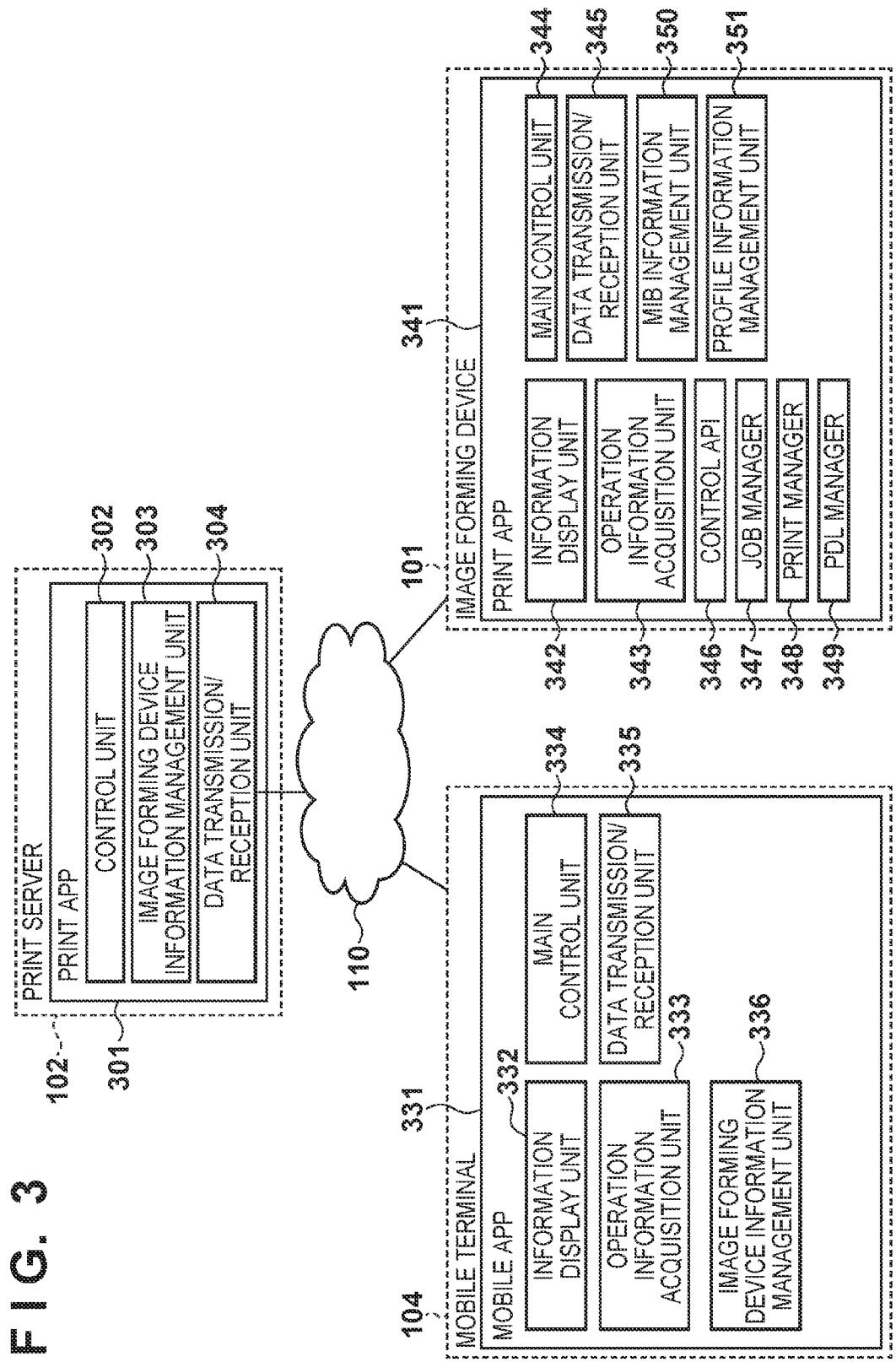
FIG. 3 shows one example of a software configuration of devices.

The following describes a software configuration of the devices constituting the print system 1000 with reference to FIG. 3. FIG. 3 shows one example of a software configuration of the devices constituting the print system 1000.

Programs that realize the functions (module units) of each software (application) shown in FIG. 3 are stored in the ROM 204 and the like in each device. More specifically, the functions of the devices and the processes according to the flowcharts described later are realized by the CPU 202 loading the programs into the RAM 203 and executing the programs. Note that all or a part of the functions of the devices and the processes according to the flowcharts described later may be realized using special-purpose hardware.

Software Configuration (Mobile Terminal)

A description is now given of a software configuration of the mobile terminal 104. A main control unit 334 controls an application (mobile app) 331 for detecting devices for the mobile terminal 104 according to the present invention, and issues instructions to and manages the module units described later. An information display unit 332 provides the user with a user interface (UI) of the mobile application 331 in accordance with the instructions from the main control unit 334.

Figure 4:
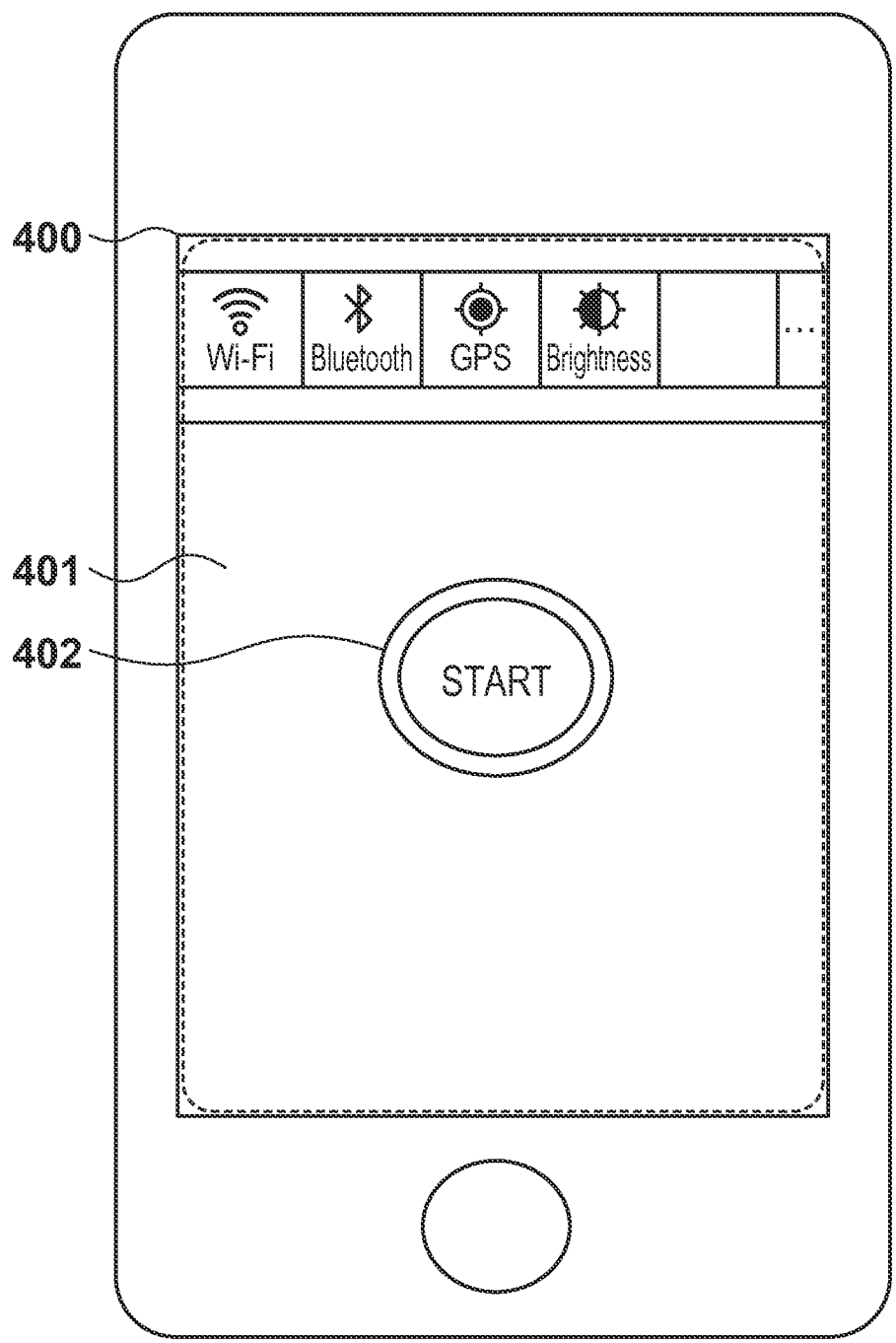
FIG. 4 shows one example of a screen of a mobile terminal.

FIG. 4 shows one example of a screen (mobile terminal screen 400) that provides a UI of the mobile application 331 (UI for a mobile terminal). The mobile terminal screen 400 is displayed on the touchscreen of the mobile terminal 104. On the mobile terminal screen 400, a UI such as an icon and a button is displayed in a display/operation area 401, and a user operation is received via the displayed UI. An image forming device detection button 402 is for detecting an image forming device. Specifics of the image forming device detection button 402 are described later with reference to the flowcharts.

Note that the form (e.g. location, size, coverage, arrangement, and displayed content) of a UI of the mobile application 331 is not limited to the form shown in FIG. 4. Any configuration that can realize the functions of the mobile terminal 104 may be adopted.

An operation information acquisition unit 333 acquires information of a user operation on the UI of the mobile application 331 displayed by the information display unit 332, and notifies the main control unit 334 of the acquired information. For example, when the user touches the area 401 in which graphics, points, sections, and the like are displayed by hand, the operation information acquisition unit 333 senses information of a location touched on the screen and transmits the sensed information of the location to the main control unit 334.

A data transmission/reception unit 335 transmits data to and receives data from the print server 102, the image forming device 101 and the like, and exchanges the transmitted/received data with the main control unit 334. An image forming device information management unit 336 manages image forming device information acquired from the print server 102, the image forming device 101 and the like. The image forming device information is accumulated as an image forming device information database. Specifics of a table structure of the image forming device information (mobile terminal) are described later. Note that the image forming device information managed in the mobile terminal 104 is also referred to as first image forming device information.

Software Configuration (Image Forming Device)

Next, a description is given of a software configuration of the image forming device 101.

A main control unit 344 controls a print application 341 of the image forming device 101, and issues instructions to and manages the module units described later. An information display unit 342 provides the user with a UI of the print application 341 in accordance with the instructions from the main control unit 344.

An operation information acquisition unit 343 acquires information of a user operation on the UI of the print application 341 displayed by the information display unit 342, and notifies the main control unit 344 of the acquired information.

A data transmission/reception unit 345 transmits data to and receives data from the print server 102, the mobile terminal 104 and the like, and exchanges the transmitted/received data with the main control unit 344.

With respect to the main control unit 344, a control API 346 functions as an interface for accessing a job manager 347, a print manager 348 and a PDL manager 349. Print instructions received by the information display unit 342 or the data transmission/reception unit 345 are realized by execution of the control API 346 through the main control unit 344.

The job manager 347 has the functions of interpreting various types of processes instructed by the control API 346 and issuing instructions to the print manager 348 and the PDL manager 349. The job manager 347 also performs the integrated management of the hardware processes executed by the image forming device.

The print manager 348 has the functions of managing and controlling the print processes instructed by the job manager 347. The PDL manager 349 has a function of applying PDL conversion to print data instructed by the job manager 347.

A management information base (MIB) information management unit 350 manages MIB information. MIB is a management database provided in a network device compatible with SNMP. This management database stores information of the network device and statistical information with information elements defined in a tree structure. The information elements are, for example, all the physical/logical networks and protocols of SNMP. MIB information denotes information defined in the above manner. Specifics of the table structure (MIB) of the managed MIB information are described later.

A profile information management unit 351 manages profile information exchanged using Bluetooth. Specifics of the table structure (profile) of the managed profile information are described later.

A status management unit (not shown in the figures) manages status information of the image forming device showing whether the image forming device is in a state where printing can be conducted. For example, the status information of the image forming device shows absence of papers of the right size and paper jam.

Software Configuration (Print Server)

Next, a description is given of a software configuration of the print server 102. Note that the print server 102 is one example of a device that, for example, manages the image forming device and issues print instructions to the image forming device.

An application (print application 301) for the print server 102 according to the present invention includes a control unit 302, an image forming device information management unit 303 and a data transmission/reception unit 304. The control unit 302 controls the print application 301. The image forming device information management unit 303 manages image forming device information. The image forming device information is accumulated as an image forming device information database. Specifics of the table structure of the image forming device information (print server) are described later. Note that the image forming device information managed by the print server 102 is also referred to as second image forming device information. The data transmission/reception unit 304 transmits data to and receives data from the image forming device 101, the mobile terminal 104 and the like, and exchanges the transmitted/received data with the control unit 302.

The print application 301 has the functions of registering, editing and deleting the second image forming device information (not shown in the figures). The control unit 302 registers, edits and deletes the image forming device information in the image forming device information management unit 303. The control unit 302 also acquires the status information from the image forming device at constant intervals based on the image forming device information registered with the image forming device information management unit 303.

Table Structure (Image Forming Device)

With reference to FIGS. 5A and 5B, the following describes the table structure (MIB) of the MIB information database managed by the MIB information management unit 350 and the table structure (profile) of the profile information database managed by the profile information management unit 351 in the print application 341 of the image forming device 101. Note that the description of the present embodiment is given under the assumption that the databases are included in a storage device, e.g. a hard disk, connected to the input/output interface 205 of the image forming device 101.

FIG. 5A shows one example of an MIB information management table 500 for managing MIB information, and FIG. 5B shows one example of a profile information management table 510 for managing profile information. The MIB information management table 500 includes the following information: MIB_ID 501, DeviceName 502, IPAddress 503, and MACAddress 504. MIB_ID 501 shows an identifier that can uniquely identify an MIB device. DeviceName 502 shows the name of an image forming device. Note that unlike identification information, DeviceName 502 is not necessarily unique. There are cases where different image forming devices have the same DeviceName 502. IPAddress 503 is an identifier that can uniquely identify a device connected to an IP network such as the Internet and intranet. Specifically, IPAddress 503 shows the IP address of an image forming device. MACAddress 504 is an address uniquely allocated to hardware of a network device in the network. Specifically, MACAddress 504 shows the MAC address of an image forming device.

The profile information management table 510 includes the following information: Bluetooth_ID 511, Device_Status 512, Device_Location 513, and Profile 514. Bluetooth_ID 511 shows an identifier that can uniquely identify a Bluetooth device. In the present embodiment, Bluetooth_ID 511 of the image forming device 101 has the same value as the identifier thereof registered as MIB_ID 501. Device_Status 512 shows whether or not an image forming device is in a state where printing can be conducted. For example, Device_Status 512 shows absence of papers of the right size and paper jam. Device_Location 513 shows information related to the location of an image forming device (e.g. latitude and longitude). Profile 514 shows the names of the standardized protocols used in communication between devices. For example, in the present embodiment, Generic Access Profile (GAP), Basic Print Profile (BPP) and Generic Object Exchange Profile (GOEP) are used as Bluetooth profiles. It should be noted, however, that the present invention is not limited in this way.

For example, alternatively, a profile other than GAP, BPP and GOEP may be additionally used. Alternatively, arbitrary profiles may be used without the use of any of GAP, BPP and GOEP.

Table Structure of Image Forming Device Information (Print Server)

With reference to FIG. 6, the following describes the table structure of the database of the image forming device information (print server) managed by the image forming device information management unit 303 in the print application 301 of the print server 102. Note that the description of the present embodiment is given under the assumption that the database is included in a storage device, e.g. a hard disk, connected to the input/output interface 205 of the print server 102.

FIG. 6 shows one example of a table for managing the image forming device information (print server). An image forming device information management table 600 includes the following information: Real Printer ID (RPID) 601, DeviceName 602, Device_Location 603, DeviceID 604, IPAddress 605, Capability 606, and Device_Status 607. RPID 601 shows an identifier that is allocated by the print server 102 to uniquely identify an image forming device. DeviceName 602 shows the name of an image forming device. In the present embodiment, DeviceName 602 of the image forming device 101 has the same value as DeviceName 502 registered with the MIB information management table 500 in the image forming device 101. Device_Location 603 shows location information of an image forming device. In the present embodiment, Device_Location 603 of the image forming device 101 has the same value as Device_Location 513 registered with the profile information management table 510 in the image forming device 101. DeviceID 604 is a value for identifying an image forming device. Specifically, DeviceID 604 stores a value acquired from an image forming device. In the present embodiment, DeviceID 604 of the image forming device 101 has the same value as MIB_ID 501 and Bluetooth_ID 511. IPAddress 605 stores the IP address of an image forming device. In the present embodiment, IPAddress 605 has the same value as IPAddress 503 of the image forming device 101 registered with the MIB information management table 500 in the image forming device 101. Capability 606 shows capability information of an image forming device. For example, Capability 606 includes information showing whether or not an image forming device can conduct double-sided printing, color printing and booklet printing, and showing the size of papers that can be output. Device_Status 607 shows whether or not an image forming device is in a state where printing can be conducted. Specifically, Device_Status 607 stores a value acquired from an image forming device.

Table Structure of Image Forming Device Information (Mobile Terminal)

With reference to FIGS. 7A and 7B, the following describes the table structure of the database of the image forming device information (mobile terminal) managed by the image forming device information management unit 336 and a storage unit (not shown in the figures) in the mobile application 331 of the mobile terminal 104. Note that the description of the present embodiment is given under the assumption that the database is included in a storage device, e.g. a hard disk, connected to the input/output interface 205 of the mobile terminal 104.

FIG. 7A shows one example of an acquired device information management table 700 for managing the acquired image forming device information, and FIG. 7B shows one example of a post-duplication-removal device management table 710. The acquired device information management table 700 includes the following information: Acquired Device ID (ADID) 701, AcquiredSource 702, Status 703, OrignalData 704, and MDID 705. ADID 701 shows information for uniquely identifying an image forming device according to the acquired image forming device information. For example, information acquired via LAN would be MIB_ID, information acquired via Bluetooth would be Bluetooth_ID, and information acquired from a print server would be RPID. AcquiredSource 702 stores information for identifying the source from which the image forming device information has been acquired (that is to say, the provider of the image forming device information). Status 703 stores information showing whether or not an image forming device can be accessed. OrignalData 704 stores the acquired data (image forming device information). MDID 705 stores a value of MDID 711, which is associated after a duplication removal process. More specifically, assume a single image forming device provided with interfaces corresponding to a plurality of communication media. Here, when acquiring pieces of information showing this single image forming device as separate image forming devices corresponding to the communication media, these image forming devices are integrated as one and registered with the list, and MDID is recorded in the list as identification information of the integrated image forming device.

The post-duplication-removal device management table 710 includes the following information: Mobile Device ID (MDID) 711, Device_Key 712, DeviceName 713, Device_Status 714, Capability 715, DeviceLocation 716, and Status 717. MDID 711 shows an identifier for uniquely identifying an image forming device for which duplication has been removed. Device_Key 712 stores a value used as a key to remove the duplication. DeviceName 713 shows the name of an image forming device. Device_Status 714 shows the status of an image forming device. DeviceLocation 716 shows location information. Status 717 shows whether or not an image forming device can be accessed. Specifics of the records in the tables are described later with reference to the flowcharts.

Process of Mobile Terminal (General)

The following describes an overview of a process of the mobile terminal 104 with reference to FIG. 8. The mobile terminal 104 implements the flow of a flowchart 800 when the user presses the image forming device detection button 402 displayed during execution of the mobile app. In S801, when the user presses the image forming device detection button 402, the mobile application 331 switches the image forming device detection button 402 to the on state. In the following S802 to S804, a trigger is constantly monitored in S802 until the image forming device detection button 402 is switched to the off state by the user pressing the image forming device detection button 402 again. When a trigger occurs in S802, the mobile terminal 104 proceeds to the process of S803.

The following are the types of the trigger. For instance, in S802, a logical sum of the following triggers is determined.

Button-on trigger that occurs immediately after the image forming device detection button 402 is pressed. When the image forming device detection button 402 is switched on, the result of determination in S802 is Yes. In the subsequent loop, the result of determination regarding this trigger is No.

Timer trigger that occurs when a predetermine time period has elapsed. This timer is set in, for example, S804.

Wi-Fi access point detection trigger that occurs when a Wi-Fi access point has been detected.

Wi-Fi access point disconnection trigger that occurs when Wi-Fi connection is disconnected. The detection and disconnection of a Wi-Fi access point are monitored by a Wi-Fi network management layer and the like below the mobile app. The monitored status is written to a memory shared with the mobile app. This status is determined in S802. The following triggers work in the same manner as Wi-Fi.

Location information change trigger that occurs when the user has moved by a certain distance.

Bluetooth detection trigger that occurs when a compatible Bluetooth device has been detected.

Bluetooth disconnection trigger that occurs when a Bluetooth device has been disconnected.

Wi-Fi Direct detection trigger that occurs when an image forming device with which Wi-Fi Direct can be used has been detected.

Wi-Fi Direct disconnection trigger that occurs when Wi-Fi Direct connection has been disconnected.

When the occurrence of an event that serves as a trigger has been detected in S802, the mobile application 331 executes a process for acquiring the image forming device information in S803. The following are the types of the process for acquiring the image forming device information.

Process for acquiring the image forming device information via LAN.

Process for acquiring the image forming device information from a print server.

Process for acquiring the image forming device information via Bluetooth.

Process for acquiring the image forming device information via Wi-Fi Direct.

A process for deactivating the image forming device information (image forming device information deactivation process), which is not the acquisition process, is executed for some types of a trigger event.

FIG. 9 shows a correspondence table showing processes for acquiring the image forming device information in correspondence with the types of trigger events. For example, when a trigger event is the button-on or the expiration of the timer, the image forming device information is acquired from all the acquisition sources. See FIG. 9 for the other trigger events. Specifics of these processes for acquiring the image forming device information in S803 are described later with reference to the flowcharts.

Next, in S804, the mobile application 331 executes an image forming device list update process. Specifics of S804 are described later with reference to a flowchart.

Process for Acquiring Image Forming Device Information Via LAN

Figure 10A:
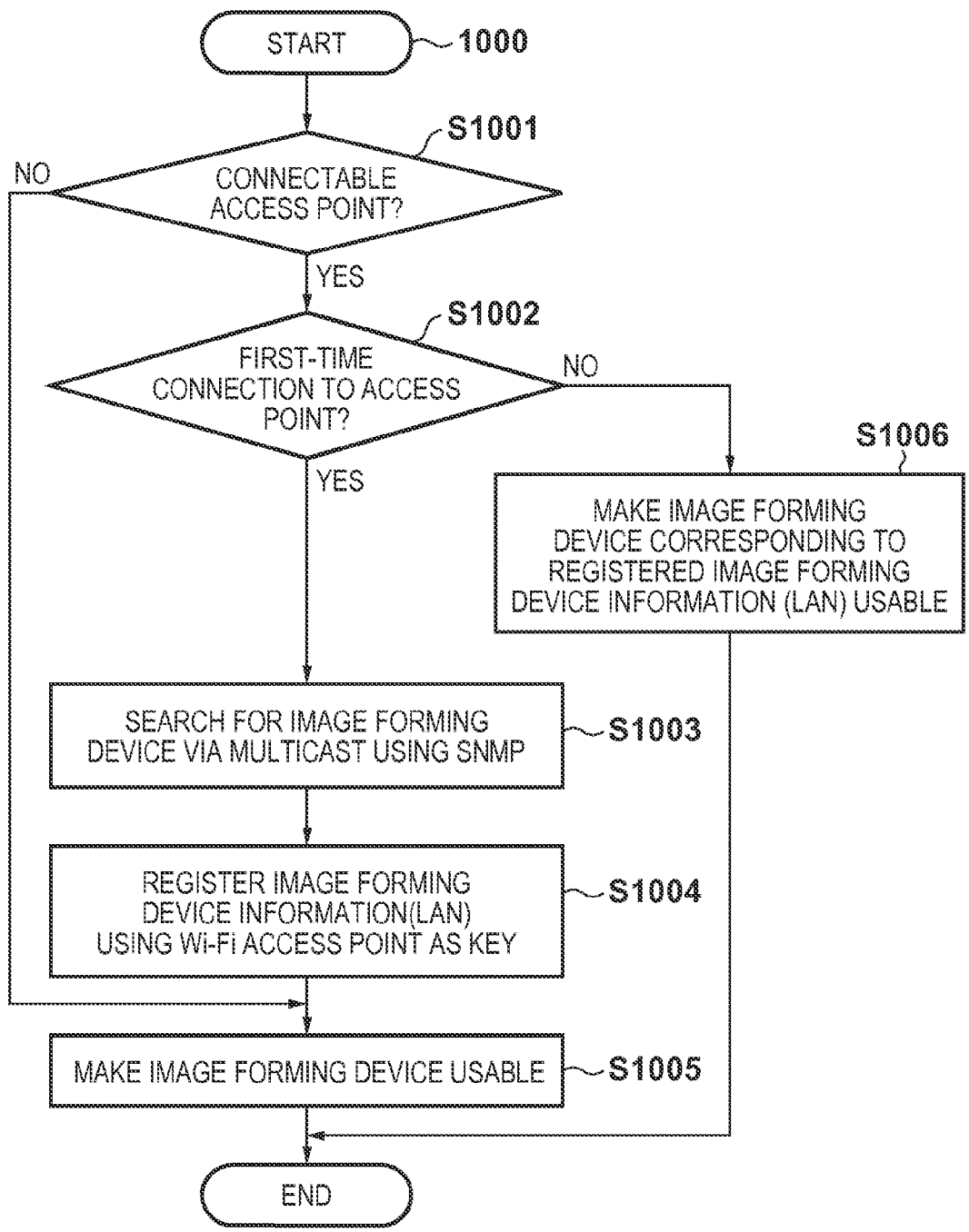
FIGS. 10A to 10E show examples of a flowchart according to an image forming device information acquisition process.

FIGS. 10A to 10E illustrate the process for acquiring the image forming device information in S803. Although not shown in the figures, in S803, the type of a trigger is determined first, and with reference to the correspondence table of FIG. 9 based on the determined type, the processes corresponding to the determined type are all executed. With reference to FIG. 10A, the following describes the process executed by the mobile application 331 of the mobile terminal 104 to acquire the image forming device information in LAN, that is to say, the MIB information via LAN (hereinafter referred to as the image forming device information (LAN)). FIG. 10A shows one example of a flowchart according to a process 1000 for acquiring the image forming device information (LAN) via LAN. As shown in the table of FIG. 9, this process is executed when any of the button-on trigger, the timer trigger and the Wi-Fi access point detection trigger has occurred.

In S1001, the main control unit 334 determines whether or not there is a connectable access point. When there is a connectable access point, the main control unit 334 determines whether or not this is the first-time connection to the connectable access point in S1002. When the main control unit 334 determines that this is the first-time connection to the connectable access point, the data transmission/reception unit transmits a multicast packet using SNMP to search for an image forming device in S1003.

Next, in S1004, the image forming device information management unit 336 acquires the image forming device information (MIB) from MIB of the detected image forming device, and registers the acquired information with the acquired device information management table 700 using the Wi-Fi access point information showing that the acquisition source is the Wi-Fi access point as the key 702. A record 706 in FIG. 7A shows the example for the case where the image forming device information (MIB) of the image forming device 101 acquired via LAN is stored in the acquired device information management table 700.

Subsequently, in S1005, the image forming device information management unit 336 sets the value of Status 703 to "TRUE" so as to make the registered image forming device usable. In this way, the registered image forming device is added as a usable device.

On the other hand, when the main control unit 334 determines that this is not the first-time connection to the connectable access point in S1002, the image forming device information acquired from the connectable access point (that is to say, acquired via LAN) had already been registered as a record with the acquired device information management table 700 in S1004. Therefore, in S1006, in order to make the corresponding image forming device usable, the value of Status 703 corresponding thereto in the acquired device information management table 700 is set to "TRUE". The record 706 in FIG. 7A shows the example for the case where the image forming device information of the image forming device 101 is stored in the acquired device information management table 700.

As an existing image forming device is also registered with the post-duplication-removal device management table 710, when the existing image forming device is activated, the post-duplication-removal device management table 710 is searched for a record of an image forming device corresponding to MDID 711 that matches MDID 705 of the activated image forming device, and Status 717 of the searched record is also set to "TRUE" for activation. The same goes for other trigger events.

Process for Acquiring Image Forming Device Information from Print Server

Figure 10B:
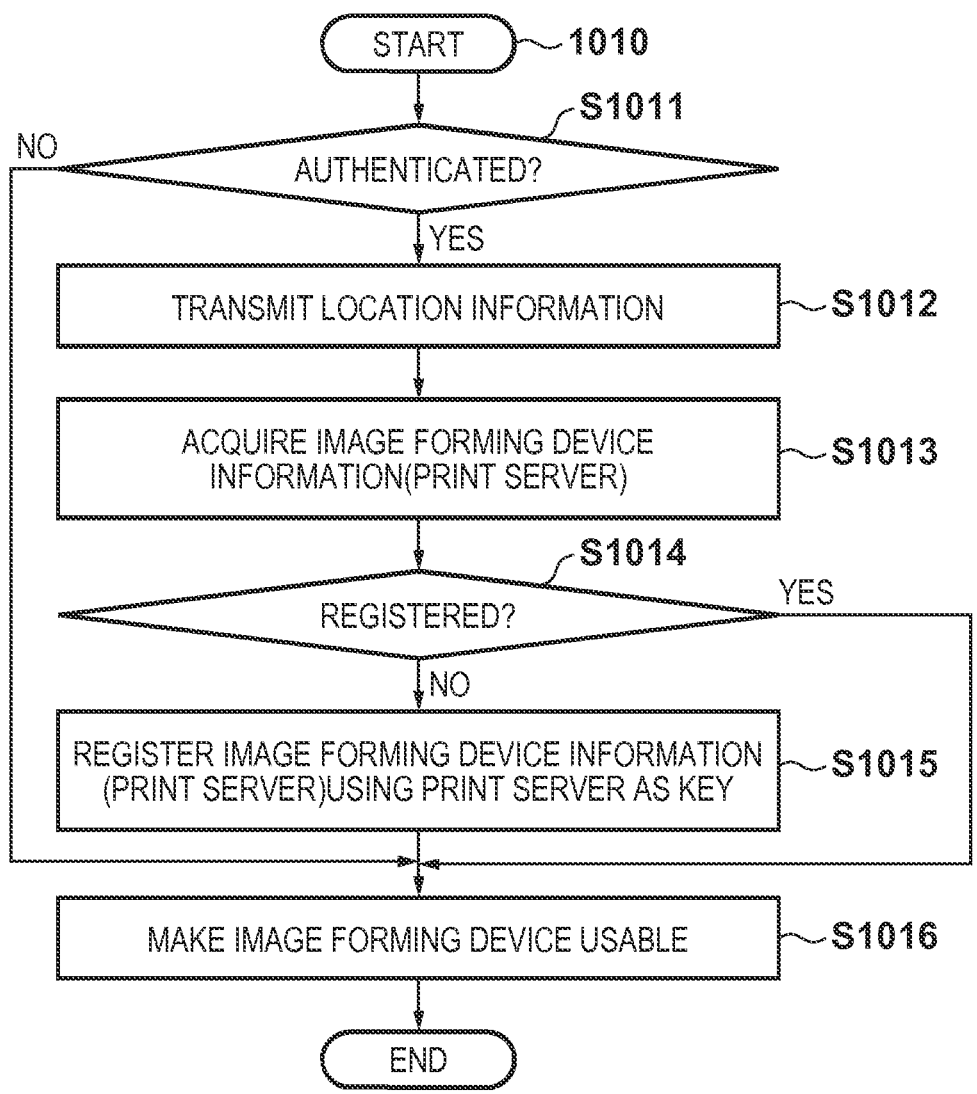

With reference to FIG. 10B, the following describes the process executed by the mobile application 331 of the mobile terminal 104 to acquire the image forming device information of a usable image forming device from the print server 102 (hereinafter referred to as image forming device information (print server)). FIG. 10B shows one example of a flowchart according to a process 1010 for acquiring the image forming device information (print server). As shown in the table of FIG. 9, this process is executed when any of the button-on trigger, the timer trigger and the location information change trigger has occurred.

In S1011, the data transmission/reception unit 335 makes a request to the print server 102 for authentication. When the authentication succeeds, the data transmission/reception unit 335 transmits the current location information of the mobile terminal to the print server 102 in S1012. The location information is acquired using a GPS function (not shown in the figures) and the like of the mobile terminal. However, when there is no GPS function, an alternative method may be used whereby, for example, the location information of a wireless LAN access point is acquired and transmitted instead. Upon receiving data of the location information, the data transmission/reception unit 304 of the print server 102 notifies the control unit 302 of the received data of the location information. The control unit 302 acquires the image forming device information by searching the image forming device information management table 600 in the image forming device information management unit 303 for an image forming device that is located at a close distance based on the location information. In the present example, the device location information registered with the image forming device information management table 600 and the location information of the mobile terminal are expressed in coordinate values based on latitude and longitude. Therefore, it is easy to obtain a distance between devices. The control unit 302 transmits the acquired image forming device information to the mobile terminal 104 through the data transmission/reception unit 304.

In S1013, the data transmission/reception unit 335 of the mobile terminal receives and acquires the image forming device information (print server) of the usable image forming device from the print server. In S1014, the image forming device information management unit 336 determines whether or not the acquired image forming device information (print server) has already been registered. When the acquired image forming device information (print server) has not been registered yet, the image forming device information management unit 336 registers the acquired image forming device information (print server) with the acquired device information management table 700 using information showing that the acquisition source is the print server as a key in S1015.

Subsequently, in S1016, in order to make the corresponding image forming device usable, the image forming device information management unit 336 sets the value of Status 703 corresponding thereto in the acquired device information management table 700 to "TRUE".

A record 707 in FIG. 7A shows the example for the case where the image forming device information (print server) of the image forming device 101 is stored in the acquired device information management table 700.

Process for Acquiring Image Forming Device Information Via Bluetooth

Figure 10C:
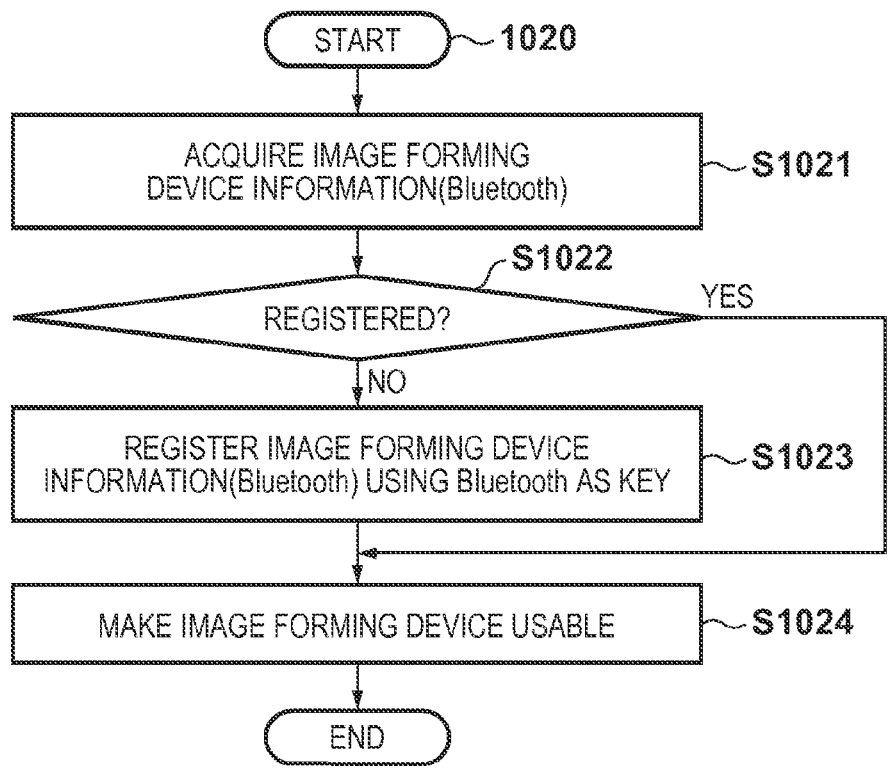

With reference to FIG. 10C, the following describes the process executed by the mobile application 331 of the mobile terminal 104 to acquire the image forming device information from the image forming device 101 using Bluetooth protocols (hereinafter referred to as image forming device information (Bluetooth)). FIG. 10C shows one example of a flowchart according to the process for acquiring the image forming device information (Bluetooth). As shown in the table of FIG. 9, this process is executed when any of the button-on trigger, the timer trigger and the Bluetooth detection trigger has occurred.

In S1021, the data transmission/reception unit 335 acquires the image forming device information (Bluetooth) from the image forming device 101 using Bluetooth protocols. Next, in S1022, the image forming device information management unit 336 determines whether or not the acquired image forming device information (Bluetooth) has already been registered.

When the acquired image forming device information (Bluetooth) has not been registered yet, the image forming device information management unit 336 registers the acquired image forming device information (Bluetooth) with the acquired device information management table 700 using information showing that the acquisition source is Bluetooth as a key in S1023.

Subsequently, in S1024, in order to make the corresponding image forming device usable, the image forming device information management unit 336 sets the value of Status 703 corresponding thereto in the acquired device information management table 700 to "TRUE".

A record 708 shows the example for the case where the image forming device information (Bluetooth) of the image forming device 101 is stored in the acquired device information management table 700.

Process for Acquiring Image Forming Device Information Using Wi-Fi Direct

Figure 10D:
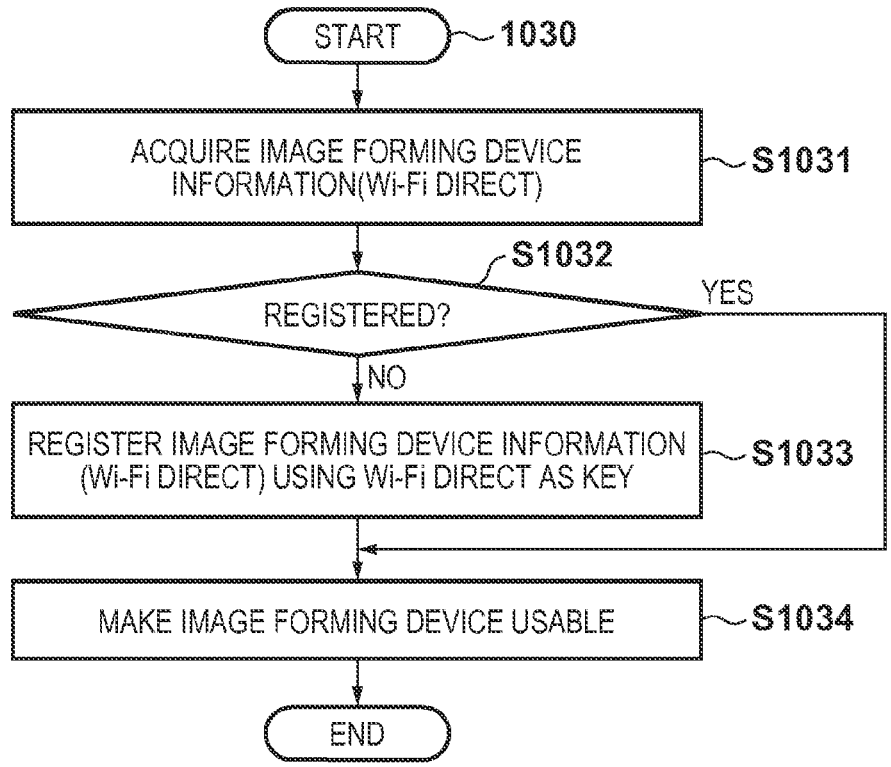

With reference to FIG. 10D, the following describes the process executed by the mobile application 331 of the mobile terminal 104 to acquire the image forming device information from the image forming device 101 using Wi-Fi Direct protocols (hereinafter referred to as image forming device information (Wi-Fi Direct)). FIG. 10D shows one example of a flowchart according to a process 1030 for acquiring the image forming device information (Wi-Fi Direct). As shown in the table of FIG. 9, this process is executed when any of the button-on trigger, the timer trigger and the Wi-Fi Direct detection trigger has occurred.

In S1031, the data transmission/reception unit 335 acquires the image forming device information (Wi-Fi Direct) from the image forming device 101 using Wi-Fi Direct protocols. Next, in S1032, the image forming device information management unit 336 determines whether or not the acquired image forming device information (Wi-Fi Direct) has already been registered.

When the acquired image forming device information (Wi-Fi Direct) has not been registered yet, the image forming device information management unit 336 registers the acquired image forming device information (Wi-Fi Direct) with the acquired device information management table 700 using information showing that the acquisition source is Wi-Fi Direct as a key in S1033.

Subsequently, in S1034, in order to make the corresponding image forming device usable, the image forming device information management unit 336 sets the value of Status 703 corresponding thereto in the acquired device information management table 700 to "TRUE".

A record 708 shows the example for the case where the image forming device information (Wi-Fi Direct) of the image forming device 101 is stored in the acquired device information management table 700.

Image Forming Device Information Deactivation Process

Figure 10E:
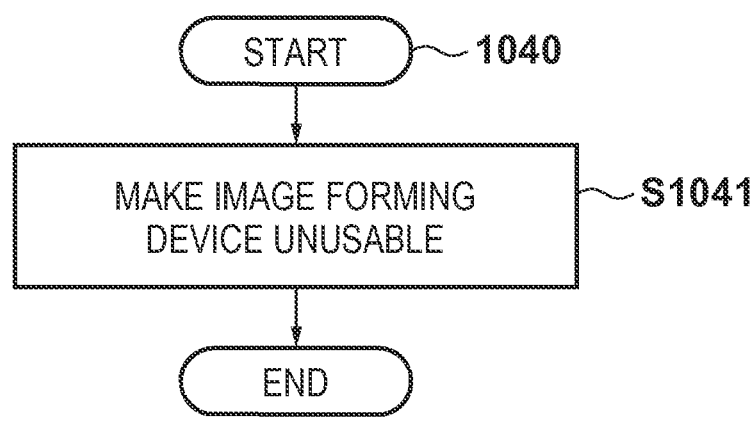

The following describes the image forming device information deactivation process executed by the mobile application 331 of the mobile terminal 104 with reference to FIG. 10E. FIG. 10E shows one example of a flowchart according to an image forming device information deactivation process 1040. As shown in the table of FIG. 9, this process is executed when any of the Wi-Fi access point disconnection trigger, the Bluetooth disconnection trigger and the Wi-Fi Direct disconnection trigger has occurred.

In S1041, in order to make an image forming device unusable, the image forming device information management unit 336 sets the value of Status 703 to "FALSE". Note that the image forming device to be deactivated may be determined in accordance with the type of the trigger event. More specifically, the acquired device information management table 700 is searched for the acquisition source (AcquiredSource) 702 corresponding to the Wi-Fi access point disconnection trigger, the Bluetooth disconnection trigger or the Wi-Fi Direct disconnection trigger, and the image forming device of the corresponding record is deactivated. For example, the image forming device corresponding to a record that includes the Wi-Fi access point, Bluetooth and Wi-Fi Direct as the acquisition source is deactivated in the cases of the Wi-Fi access point disconnection trigger, the Bluetooth disconnection trigger and the Wi-Fi Direct disconnection trigger, respectively. At this time, the acquired device information management table 700 is searched for other image forming devices having the MDID of the deactivated image forming device, and when these other image forming devices are not deactivated, they are deactivated by setting Status 717 thereof registered with the post-duplication-removal device management table 710 to "FALSE".

Image Forming Device List Update Process

Figure 11:
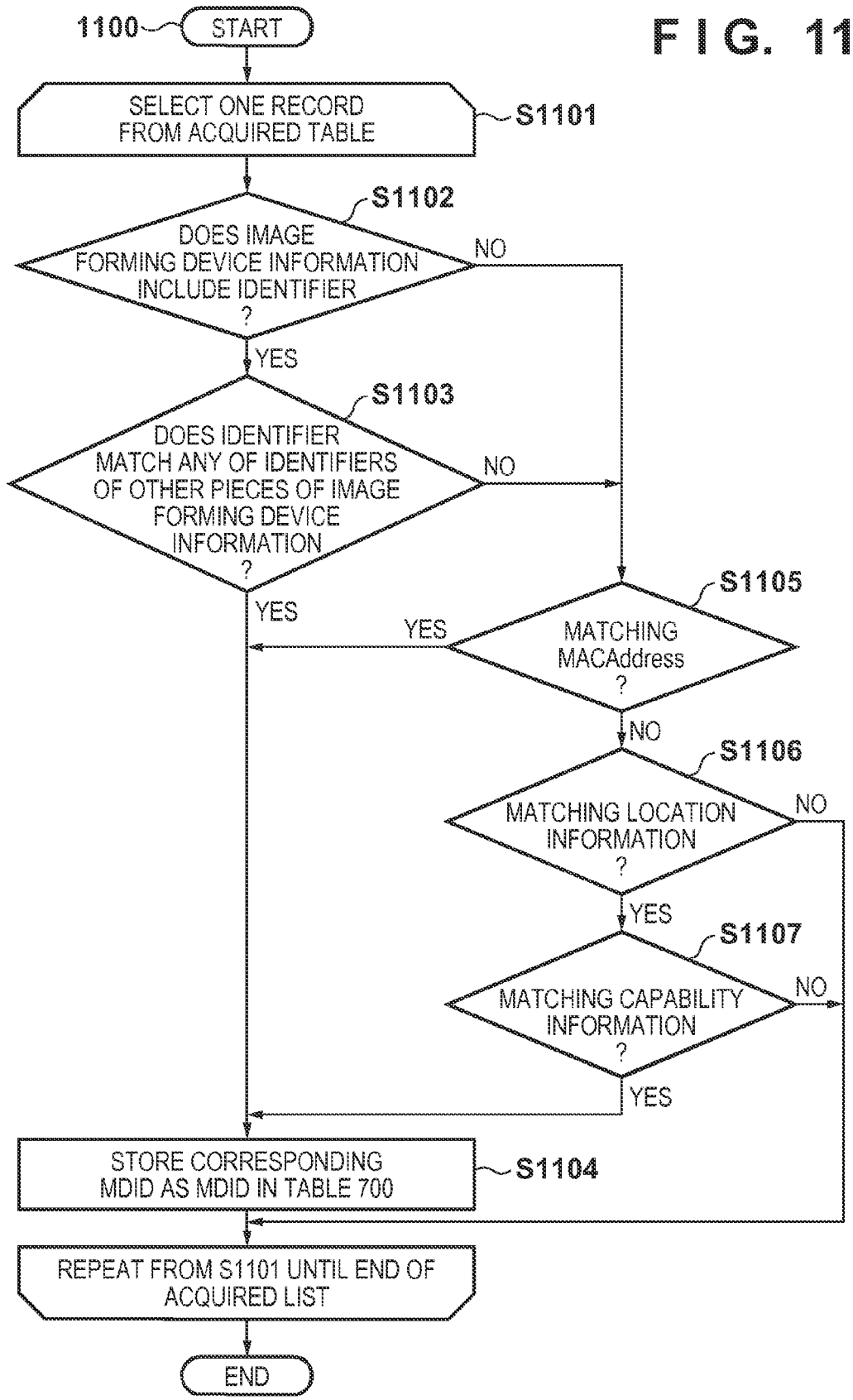
FIG. 11 shows one example of a flowchart according to an image forming device list update process.

The following describes an image forming device list update process executed by the mobile application 331 of the mobile terminal 104 with reference to FIG. 11. FIG. 11 shows one example of a flowchart according to an image forming device list update process 1100.

In S1101, the main control unit 334 acquires one piece of record information from the acquired device information management table 700 in the image forming device information management unit 336. The processing steps from S1101 to S1107 are executed for each record of the acquired device information management table 700 until the final record. This acquired piece of record information is referred to as a target record. In the case where a record newly added in S803 is identifiable, only the added record may be used as the target record. The added record can be determined because the value of MDID 705 is not registered therefor.

Next, in S1102, the main control unit 334 determines whether or not OriginalData 704 of the acquired record shows an identifier. When OriginalData 704 of the acquired record shows the identifier, the main control unit 334 proceeds to the process of S1103.

In S1103, the main control unit 334 compares the identifier determined in S1102 with identifiers of all the image forming devices that have already been registered with the post-duplication-removal device management table 710, and determines whether the determined identifier matches any of the identifiers of the registered image forming devices. When the determined identifier matches any of the identifiers of the registered image forming devices, the main control unit 334 proceeds to the process of S1104.

In S1104, the image forming device information management unit 336 recognizes that the image forming devices having the same identifier are the same image forming device, and therefore does not add a new record to the post-duplication-removal device management table 710. The value of MDID 711 in an existing record that has been determined to include the same identifier as the target record out of the records in the post-duplication-removal device management table 710 is stored as MDID 705 of the target record for association.

In S1105, the main control unit 334 searches for a record that includes the same MACAddress as OriginalData 704 of the target record from among the records that are included in the acquired device information management table 700 and that are not newly registered. When there is a record that includes the same MACAddress, MDID 705 of this record is copied to MDID 705 of the target record. This MDID 705 should match MDID of one of the records in the post-duplication-removal device management table 710. In S1106, the main control unit 334 searches for a record with matching location information in a manner similar to S1105. In S1107, the main control unit 334 searches for a record with matching capability information.

When there is a record with matching location information and matching capability information, MDID of this record is copied to MDID 705 of the target record in a manner similar to S1105.

When the above procedure fails to find any image forming device that can be determined to be the same image forming device based on the existing records, a new record is added to the post-duplication-removal device management table 710 based on the target record. Fields 711 to 716 are obtained, for example, from OriginalData 704 of the target record. When a record is newly added, Field 717 thereof is set to "TRUE".

The post-duplication-removal device management table 710 obtained in the above manner stores a list of image forming devices with no duplication. That is to say, in this list of image forming devices, duplication of information of image forming devices collected via different communication media has been fixed. Therefore, for example, by using the image forming device information registered with the post-duplication-removal device management table 710 when displaying the usable image forming devices that have been searched for on the user interface of the mobile terminal 104, it is possible to prevent a single device from being displayed as if it were a plurality of different devices.

As has been described above, the image forming device information list is generated by automatically deleting duplicate image forming device information without user's awareness. This saves the trouble of registering an image forming device to be used every time.

Print Path Determination Process

A description is now given of a print path determination process (not shown in the figures). When a print instruction is actually input from the mobile terminal 104, the post-duplication-removal device management table 710 is searched for an image forming device whose Status 717 shows "TRUE", that is to say, a usable image forming device. When there are a plurality of usable image forming devices, an image forming device that is closest to the mobile terminal 104 is selected based on the location information. Then, a determination is made as to whether or not a plurality of records are registered with the acquired device information management table 700 in correspondence with the usable image forming device. When a plurality of records are registered, the usable image forming device is registered in a duplicated manner via a plurality of communication media.

When there are duplicated pieces of image forming device information acquired via different communication media, it means that the corresponding image forming device can be used via any of the communication media. When a plurality of communication media are thus connected to the same image forming device, a print path is determined based on a print priority order table 1200 shown in FIG. 12. The print priority order table 1200 is stored in a storage unit (not shown in the figures) of the mobile terminal 104. The priority order may be determined in advance based on, for example, the communication cost. Alternatively, the priority order may be dynamically determined based on the communication history. In this case, for example, response time is recorded for each medium, and the priority order is dynamically determined in the order of the shortest response time. The communication medium and the image forming device determined in the above manner are displayed on the screen of the mobile terminal 104. The user checks the display and performs the confirmation input. As a result, print data is transmitted to the determined image forming device via the determined communication medium, and the printing is conducted. At this time, the user interface may present to the user all of the plurality of usable communication media, or some of the plurality of usable communication media selected in accordance with the priority order and the like, in addition to the candidate image forming device to be used, so as to have the user select one of the presented communication media. Such a user interface is unique to the present embodiment that determines the identicalness of one image forming device that has been recognized as separate image forming devices via different communication media.

As has been described above, the printing is conducted by automatically determining the image forming device and the communication medium, that is to say, a communication path for the printing, without user's awareness. This saves the trouble of conducting the printing by selecting an appropriate printing method every time.

Note that when presenting an image forming device using the selected communication medium to the user, should other communication media be usable, the user interface may include a button and the like for rejecting the use of the presented image forming device. In the case where the user rejects the displayed image forming device on the user interface of the mobile terminal, if the image forming device to be used is presented in correspondence with each medium and this image forming device can be used via a plurality of communication media, then this image forming device is left as-is, and an image forming device that uses the communication medium which comes next to the rejected communication medium in the priority order is presented as the next candidate.

Image Forming Device Detection Process

When the user attempts to conduct the printing by selecting a document in the state where the image forming device detection button 402 has not been pressed and the usable image forming devices are not listed, the image forming device information acquisition process S803 is executed when displaying an image forming device selection screen (not shown in the figures). In this case, the image forming device information acquisition process S803 is paused when an image forming device that is desired by the user and can conduct printing is found for the first time, and this image forming device is presented to the user.

As has been described above, an appropriate image forming device and an appropriate print path can be automatically found and presented to the user without user's awareness. This makes it easier for the user to use the mobile terminal.

Furthermore, when network image forming devices that have been recognized as separate devices are actually one device, the identicalness of this device is determined. In this way, a candidate image forming device to be used is presented to the user as one device that can be used via a plurality of communication media. As a result, confusion of the user can be prevented and usability is improved.

Second Embodiment

In the present embodiment, configurations that are the same as the first embodiment are given the same reference signs thereas, and a description thereof is omitted as appropriate.

In the present embodiment, the print server 102 further includes an image conversion unit (not shown in the figures) that converts application data to PDL data.

Print Path Determination Process

When the mobile terminal 104 prints the application data, the main control unit 334 of the mobile terminal 104 determines whether or not the application data can be converted to PDL data in the mobile terminal 104. When the application data cannot be converted to PDL data in the mobile terminal 104, the main control unit 334 inquires about whether or not the print server 102 can convert the application data to PDL data. When the print server 102 can convert the application data to PDL data, the printing path is determined such that the printing is conducted via the print server without using a print priority table (not shown in the figures).

When an additional service needs to be provided by the print server in the above manner, the image forming device information of usable image forming devices is acquired from the print server, and an image forming device to be used is selected from among the usable image forming devices. It goes without saying that a medium that connects to the print server 102 via LAN is selected.

Image Forming Device Status Information Acquisition Process

Even when the print path is uniquely determined such that the printing is conducted via the print server 102, the latest information on the status of an image forming device can be acquired via Bluetooth. That is to say, even when the print path is determined such that the printing is conducted via the print server 102, the latest information can be used by acquiring the status of the image forming device 101 via Bluetooth.

In other words, in the present embodiment, the image forming device information may be acquired via a medium that is different from a medium used in transmission of print data.

Other Embodiments

The present invention is realized also by executing a process whereby software (program) that realizes the functions described in the above embodiments is provided to a system or a device via a network or various types of storage media, and a computer (or CPU, MPU, etc.) of that system or device reads and executes the program.

The configurations described in the above embodiments make it easier to use a mobile terminal.

Although preferred embodiments of the present invention have been elaborated above, the present invention is not limited to these specific embodiments. Various modifications and changes may be made within the scope of the concept of the present invention described in the claims.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-072344, filed Mar. 27, 2012, which is hereby incorporated by reference herein in its entirety.

What is claimed is:

1. An information processing device comprising:
an acquisition unit that acquires first information related to an image forming device from a server and second information related to the image forming device from the image forming device;
a presentation unit that presents information related to the image forming device so that the image forming device is a single device when the first information is the same as the second information; and a unit that acquires location information of the information processing device, wherein the acquisition unit transmits the location information of the information processing device to the server and acquires the first and second information related to an image forming device that the server has determined to be closest to a location shown by the location information.

2. The information processing device according to claim 1, wherein when the acquisition unit has acquired the first and second information related to a plurality of image forming devices from the server and the plurality of image forming devices via a plurality of communication media, the presentation unit presents, as an image forming device to be used, an image forming device selected in accordance with a priority order that has been predetermined with respect to the plurality of communication media.

3. The information processing device according to claim 1, wherein the acquisition unit acquires the first or second information related to the image forming device via a communication medium connected to the server or the image forming device in accordance with an instruction issued by the user for detecting an image forming device.

4. The information processing device according to claim 1, wherein the information processing device is connectable to the server via LAN or a telephone line as a communication medium, and is connectable to the image forming device via LAN or near field communication as a communication medium.

5. The information processing device according to claim 1, further comprising:

a unit that transmits print data to an image forming device presented by the presentation unit via a communication medium through which the first or second information related to the image forming device has been acquired, and that causes the image forming device to conduct printing.

6. An information processing method executed by an information processing device, comprising:

an acquisition step of acquiring first information related to an image forming device from a server and second information related to the image forming device from the image forming device;

a presentation step of presenting information related to the image forming device so that the image forming device is a single device when the first information is the same as the second information; and a step of acquiring location information of the information processing device, wherein the acquisition step transmits the location information of the information processing device to the server and acquires the first and second information related to an image forming device that the server has determined to be closest to a location shown by the location information.

7. The information processing method according to claim 6, wherein when the acquisition step has acquired the first and the second information related to a plurality of image forming devices from the server and the plurality of image forming devices via a plurality of communication media, the presentation step presents, as an image forming device to be used, an image forming device selected in accordance with a priority order that has been predetermined with respect to the plurality of communication media.

8. The information processing method according to claim 6, wherein the acquisition step acquires the first or second information related to the image forming device via a communication medium connected to the server or the image forming device in accordance with an instruction issued by the user for detecting an image forming device.

9. The information processing method according to claim 6, wherein the information processing device is connectable to the server via LAN or a telephone line as a communication medium, and is connectable to the image forming device via LAN or near field communication as a communication medium.

10. The information processing method according to claim 6, further comprising:

a step of transmitting print data to an image forming device presented in the presentation step via a communication medium through which the first or second information related to the image forming device has been acquired, and of causing the image forming device to conduct printing.

11. A non-transitory computer-readable medium having recorded therein a program, wherein an information processing method is executed by an information processing device executing the program, the method comprising:

an acquisition step of acquiring first information related to an image forming device from a server and second information related to the image forming device from the image forming device;

a presentation step of presenting information related to the image forming device so that the image forming device is a single device when the first information is the same as the second information; and a step of acquiring location information of the information processing device, wherein the acquisition step transmits the location information of the information processing device to the server and acquires the first and second information related to an image forming device that the server has determined to be closest to a location shown by the location information.

* * * * *